(12) United States Patent
Moosavi et al.

(10) Patent No.: US 8,787,830 B2
(45) Date of Patent: Jul. 22, 2014

(54) NEAR-FIELD COMMUNICATION (NFC) SYSTEM PROVIDING LOW POWER MODE FREQUENCY CYCLING AND RELATED METHODS

(75) Inventors: Vahid Moosavi, Kitchener (CA); Scott Douglas Rose, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 298 days.

(21) Appl. No.: 12/856,783

(22) Filed: Aug. 16, 2010

(65) Prior Publication Data

US 2012/0040610 A1 Feb. 16, 2012

(51) Int. Cl.
*H04B 5/00* (2006.01)

(52) U.S. Cl.
USPC ..... 455/41.1; 455/41.2; 455/41.3; 455/426.1; 455/67.11; 455/572; 455/574; 455/112; 455/127.1; 455/127.5

(58) Field of Classification Search
CPC .......... H04B 5/02; H04B 5/0012; H04B 5/00; H04W 88/06; H04W 76/02; H04W 8/005; H04M 2250/02; G06F 1/1613
USPC .................. 455/41.1, 41.2, 41.3, 13.2, 426.1, 455/456.1, 67.11, 572, 574, 112, 127.1, 455/127.5
See application file for complete search history.

(56) References Cited

U.S. PATENT DOCUMENTS

| | | | |
|---|---|---|---|
| 8,666,840 B1 * | 3/2014 | Matsas et al. | 705/26.1 |
| 2005/0083181 A1 * | 4/2005 | Jalkanen et al. | 340/10.34 |
| 2005/0164633 A1 | 7/2005 | Linjama et al. | 455/41.2 |
| 2005/0282588 A1 * | 12/2005 | Linjama et al. | 455/566 |
| 2006/0019717 A1 | 1/2006 | Gong | |
| 2006/0094356 A1 | 5/2006 | Dawidowsky | 455/41.1 |

(Continued)

FOREIGN PATENT DOCUMENTS

| | | | |
|---|---|---|---|
| EP | 1263199 | 12/2002 | |
| EP | 1715420 | 10/2006 | |
| EP | 1850569 | 10/2007 | ............ H04M 1/725 |
| WO | 2007/005557 | 1/2007 | ............... G06K 7/00 |

OTHER PUBLICATIONS

PatrickJ. *"Yes, Customize the home button double-tap launch"* Dec. 21, 2007: http://justanotheriphoneblog.com/wordpress/2007/12/21iphonehome-oh-yes-customize-the-home-button.

(Continued)

*Primary Examiner* — Temesgh Ghebretinsae
*Assistant Examiner* — Md Talukder
(74) *Attorney, Agent, or Firm* — Allen, Dyer, Doppelt, Milbrath & Gilchrist, P.A.

(57) ABSTRACT

A near-field communication (NFC) system may include a plurality of NFC devices each including a housing, a power source carried by the housing, at least one input device carried by the housing and assigned to a designated device function, an NFC circuit configured to wirelessly communicate using an NFC communications protocol, and a processor. The processor may be configured to initiate the designated device function based upon a first input pattern of the at least one input device, switch the NFC circuit between a higher power state and a lower power state at a first frequency, the NFC circuit in the higher power state being configured to generate an RF field to initiate NFC communications, and switch the NFC circuit between the higher and lower power states at a second frequency based upon a second input pattern of the input device(s) different from the first input pattern.

22 Claims, 15 Drawing Sheets

(56) References Cited

U.S. PATENT DOCUMENTS

| | | | |
|---|---|---|---|
| 2006/0229113 A1 | 10/2006 | Rowse | 455/574 |
| 2008/0057930 A1 | 3/2008 | Matsubara | 455/418 |
| 2008/0191892 A1* | 8/2008 | Kirkup et al. | 340/686.6 |
| 2009/0109032 A1* | 4/2009 | Braun et al. | 340/572.1 |
| 2009/0221240 A1* | 9/2009 | Zhang | 455/68 |
| 2012/0196530 A1* | 8/2012 | Moosavi et al. | 455/41.1 |
| 2012/0202423 A1* | 8/2012 | Tiedemann et al. | 455/41.1 |
| 2013/0079026 A1* | 3/2013 | Hagedorn | 455/456.1 |
| 2013/0196594 A1* | 8/2013 | Moosavi | 455/41.1 |
| 2013/0196595 A1* | 8/2013 | Byrne et al. | 455/41.1 |
| 2013/0295842 A2* | 11/2013 | Griffin et al. | 455/41.1 |
| 2013/0324169 A1* | 12/2013 | Kamal et al. | 455/466 |

OTHER PUBLICATIONS

Madlmayr et al. *"NFC Devices: Security and Privacy"* The Third International Conference on Availability, Reliability and Security: 2008 IEEE (0-7695-3104-4/08).

Nokia 6131 NFC User Guide: Issue 2: 9254007.

* cited by examiner

NEAR-FIELD COMMUNICATION (NFC) SYSTEM PROVIDING LOW POWER MODE FREQUENCY CYCLING AND RELATED METHODS

TECHNICAL FIELD

This application relates to the field of communications, and more particularly, to mobile wireless communications devices and related methods that use Near Field Communication (NFC).

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multifunction devices usually allow electronic mail (email) messages to be sent and received wirelessly, as well as access the internet via a cellular network and/or a wireless local area network (WLAN), for example.

Some mobile devices incorporate contactless card technology and/or Near Field Communication (NFC) chips. NFC technology may be used for contactless short-range communications based on radio frequency identification (RFID) standards, using magnetic field induction to enable communication between electronic devices, including mobile wireless communications devices. These short-range communications may include payment and ticketing, electronic keys, identification, device set-up service and similar information sharing. This short-range high frequency wireless communications technology may exchange data between devices over a short distance, such as only a few centimeters.

DETAILED DESCRIPTION

Figure 1:
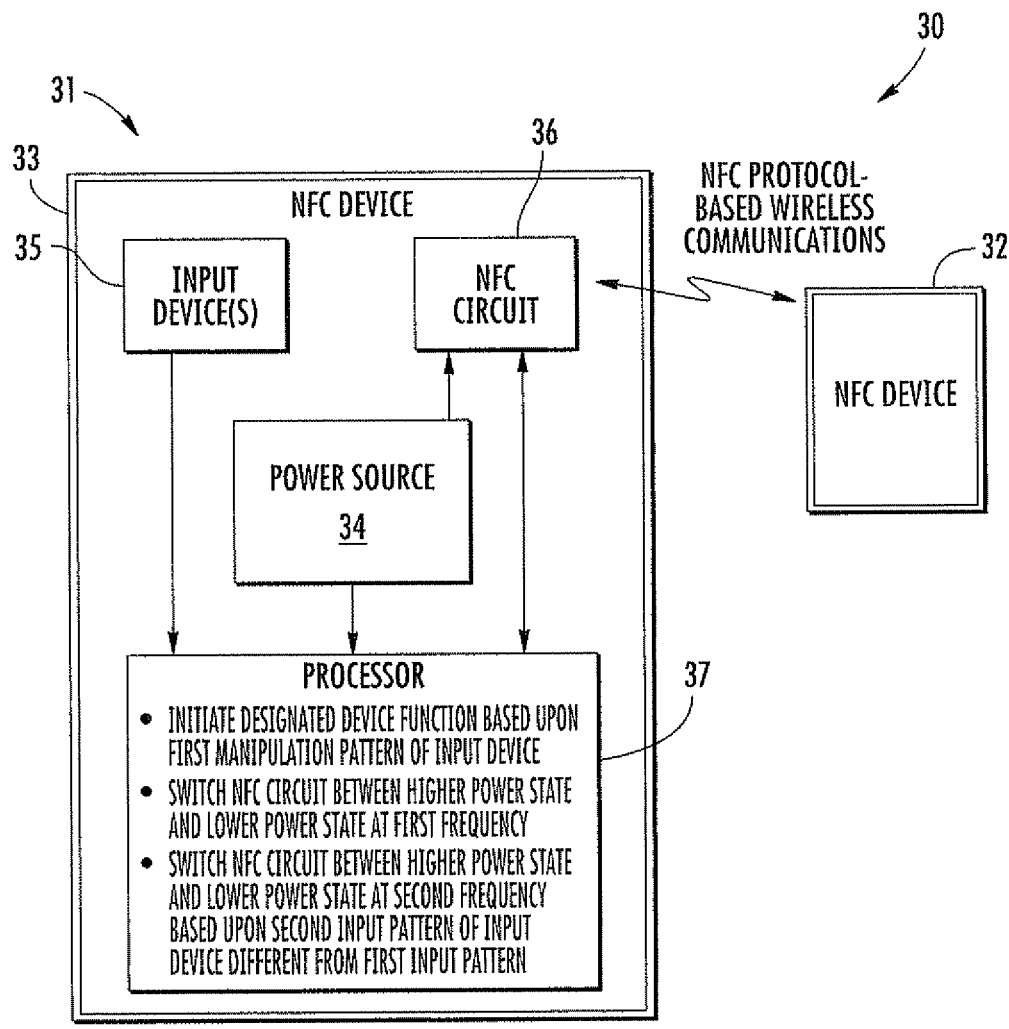
FIG. 1 is a schematic block diagram of a Near Field Communication (NFC) system in accordance with an example aspect providing NFC power state switching.

The present description is made with reference to the accompanying drawings, in which preferred embodiments are shown. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a near-field communication (NFC) system is disclosed herein which may include a plurality of NFC devices each including a housing, a power source carried by the housing, at least one input device carried by the housing and assigned to a designated device function, an NFC circuit configured to wirelessly communicate using an NFC communications protocol, and a processor carried by the housing and coupled to the power source, the at least one input device, and the NFC circuit. The processor may be configured to initiate the designated device function based upon a first input pattern of the at least one input device, and switch the NFC circuit between a higher power state and a lower power state at a first frequency, where the NFC circuit in the higher power state may be configured to generate a radio frequency (RF) field to initiate NFC communications with another one of the NFC devices, and switch the NFC circuit between the higher power state and the lower power state at a second frequency different than the first frequency based upon a second input pattern of the at least one input device different from the first input pattern. As such, the system may thereby provide desired NFC device recognition without undue delay, yet while still maintaining power savings from low-power operation.

The processor may be further configured to switch the NFC circuit from the second frequency back to the first frequency based upon a repetition of the second input pattern of the at least one input device. Also, the processor may be configured to switch the NFC circuit from the second frequency back to the first frequency after a timeout period. By way of example, the first frequency may be lower than the second frequency.

The NFC system may further include a display carried by the portable housing and coupled to the processor. As such, the processor may be further configured to generate on the display a menu for enabling initiation of NFC communications with the other NFC device upon detection thereof. By way of example, the at least one input device may comprise a menu key, and the designated device function may comprise generating a menu on the display. Other example input devices may include an audio input transducer, an accelerometer, etc. Additionally, the processor may be further configured to pass through a Uniform Resource Locator when at the second frequency and being in the higher power state.

A related NFC device may include a housing, a power source carried by the housing, at least one input device carried by the housing and assigned to a designated device function, an NFC circuit configured to wirelessly communicate using an NFC communications protocol, and a processor carried by the housing and coupled to the power source, the at least one input device, and the NFC circuit. The processor may be configured to initiate the designated device function based upon a first input pattern of the at least one input device, and switch the NFC circuit between a higher power state and a lower power state at a first frequency, where the NFC circuit in the higher power state may be configured to generate a radio frequency (RF) field to initiate NFC communications with another NFC device. The processor may also be configured to switch the NFC circuit between the higher power state and the lower power state at a second frequency different than the first frequency based upon a second input pattern of the at least one input device different from the first input pattern.

A related NFC method is for an NFC device, such as the one described briefly above, and may include initiating the designated device function based upon a first manipulation pattern of the at least one input device, and switching the NFC circuit between a higher power state and a lower power state at a first frequency, where the NFC circuit in the higher power state may be configured to generate a radio frequency (RF) field to initiate NFC communications with another NFC device. The method may further include switching the NFC circuit between the higher power state and the lower power state at a second frequency different than the first frequency based upon a second input pattern of the at least one input device different from the first input pattern.

A physical computer-readable medium having computer-executable instructions for causing an NFC device, such as the one described briefly above, to perform steps comprising initiating the designated device function based upon a first manipulation pattern of the at least one input device, and switching the NFC circuit between a higher power state and a lower power state at a first frequency, where the NFC circuit in the higher power state may be configured to generate a radio frequency (RE) field to initiate NFC communications with another NFC device. A further step may include switching the NFC circuit between the higher power state and the lower power state at a second frequency different than the first frequency based upon a second input pattern of the at least one input device different from the first input pattern.

Figure 2:
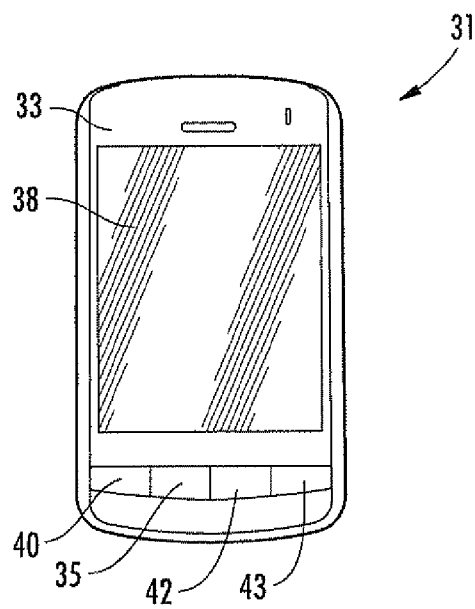
FIG. 2 is a front view of an NFC-enabled cellular device which may be used in accordance with an example aspect to implement the NFC power state switching.

Turning now to FIGS. 1 and 2, by way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of about 10 cm, but other suitable versions of near-field communication which may have different operating frequencies, effective ranges, etc., for example, may also be used.

NFC circuitry draws power when it is searching for other devices or contactless cards/tags in its vicinity. Because of privacy and security concerns, in the case of an NFC-enabled phone, it may be desirable that the device not always respond to a NFC reader that tries to charge/read the virtual card in the phone. Rather, it may be desirable that the NFC device require an action before it turns on the NFC feature and responds to readers. One such action is to require a password to be entered to activate an NFC search/recognition mode. However, entering a password may be inconvenient, time-consuming, or impractical in some circumstances. For example, when a user wants to pay for transit in a crowded subway station, it may not be practical to perform steps such as typing in a password, finding the NFC icon on the device, activating the NFC icon, etc. This problem may be exacerbated if the phone is in a locked mode, adding yet another step to be performed (i.e., unlocking the device) to place the device in the NFC recognition mode.

Another approach may be to have a separate or designated key for activating the NFC functionality. However, the space (i.e., "real estate") required for a separate, designated key to enable an NFC operational or recognition mode may be difficult to come by in many wireless communications devices. That is, with the ever-increasing amount of functionality implemented in such devices, along with the competing desire for smaller form factors, allotting the necessary real estate for such a designated NFC key simply may not be practical. Moreover, the additional cost of providing a designated key on the device may also be a drawback.

In accordance with a first aspect, an NFC system 30 illustratively includes an NFC device 31 which advantageously addresses these technical problems. More particularly, in the example embodiment the NFC system 30 illustratively includes a plurality of NFC devices, namely the NFC device 31 and a second NFC device 32. The NFC device 31 illustratively includes a housing 33, a power source 34 carried by the housing 33, one or more input keys 35 carried by the housing 33 and assigned to a designated device function, and an NFC circuit 36 configured to wirelessly communicate using an NFC communications protocol. The NFC device 31 further illustratively includes a processor 37 carried by the housing 33 which is coupled to the power source 34, the input key 35, and the NFC circuit 36. The device 32 may also include similar components to those described herein with reference to the NFC device 31, but need not in all embodiments.

Figure 5:
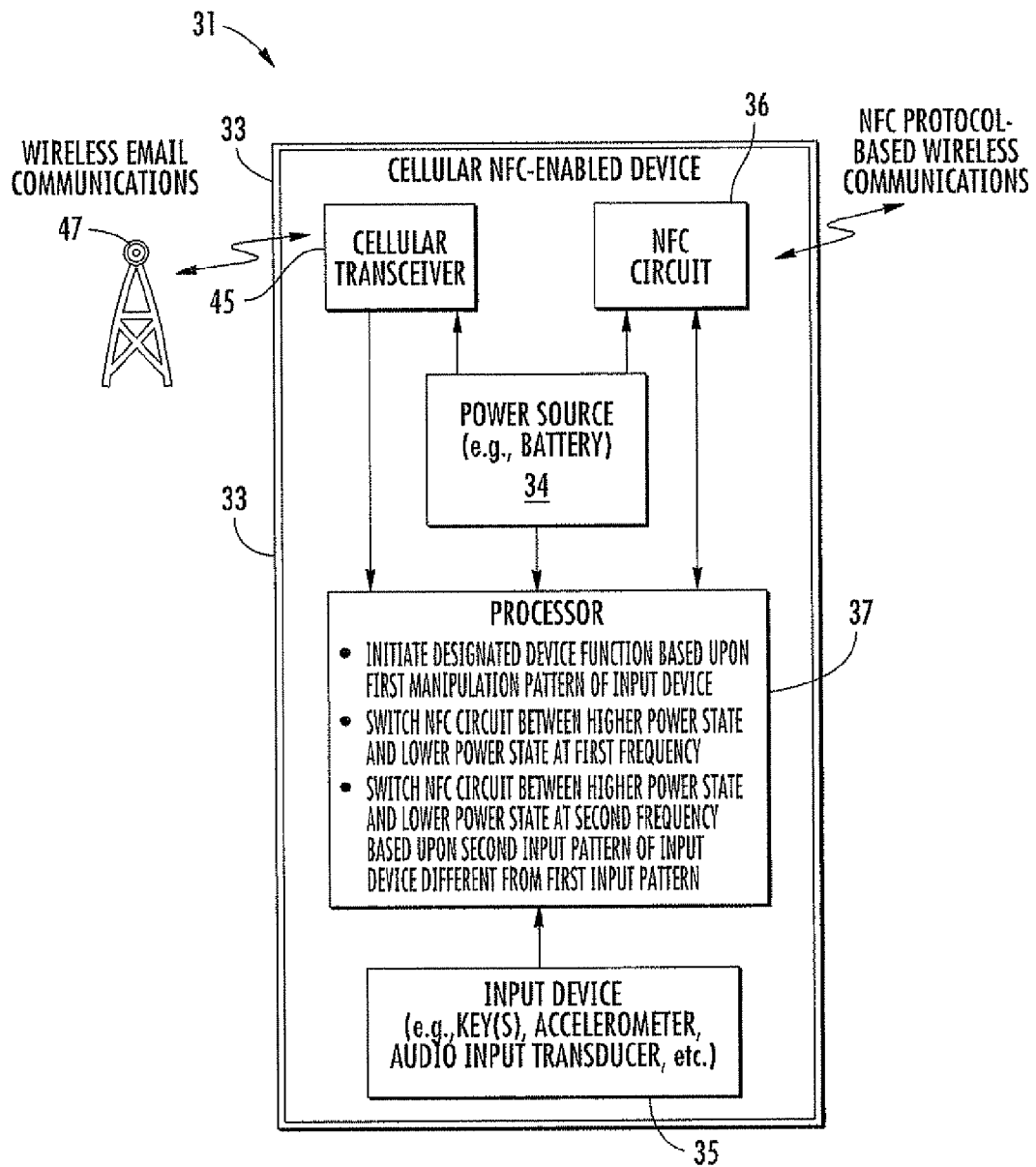
FIG. 5. is a schematic block diagram of an example NFC device of the system of FIG. 1 shown in greater detail.

The NFC device 31 as shown in FIGS. 2 and 5 comprises a mobile wireless communications device (also referred to herein as a "mobile device") cellular smart phone enabled for NFC communications by the NFC circuit 36. In this example embodiment, the NFC device 31 illustratively includes an off-hook key 40 (i.e., for initiating a phone call), a return key 42 for escaping a selection or navigating back through a menu, and an on-hook/power key 43, which may be used for disconnecting a phone call as for turning the NFC device 31 on or off by holding the key down for a designated period of time. As used herein, the term "key" means an input device that is pressed or actuated to initiate a device function or provide an input, including buttons, keypad keys, trackballs, scroll wheels, etc. It should also be noted that a display 38 of the NFC device 31 shown in FIG. 2 may be a touch screen display, and in such embodiments the input keys 35 used to initiate the NFC operations described herein may advantageously be touch screen keys.

Moreover, the NFC device 31 further illustratively includes a cellular transceiver 45 carried by the housing 33 and coupled to the power source 34 and the processor 37. Furthermore, the processor 37 may also be configured for communicating wireless voice and data via the cellular transceiver 45 via a cellular communications network (represented as a cellular tower 47 in FIG. 5), as will be described further below. By way of example, the data communications may include email messages, as shown in FIG. 5, although other data (e.g., Web data, etc.) may also be communicated. Furthermore, in some embodiments the NFC device 31 may in addition (or instead) include other types of wireless communications circuits capable of transmitting voice or other data, such as a wireless LAN, WiMAX, etc., circuit.

In the present example, the input key 35 which is used for initiating NFC operations as described further below is a menu key for generating navigation menus on the display 38. That is, the designated device function of the input (i.e., menu) key 35 is generating navigation menus, and this designated function is typically performed when the input key 35 is depressed once. Other input devices may also be used in some embodiments, such as an audio input device (e.g., microphone), accelerometer, etc.

Figure 6:
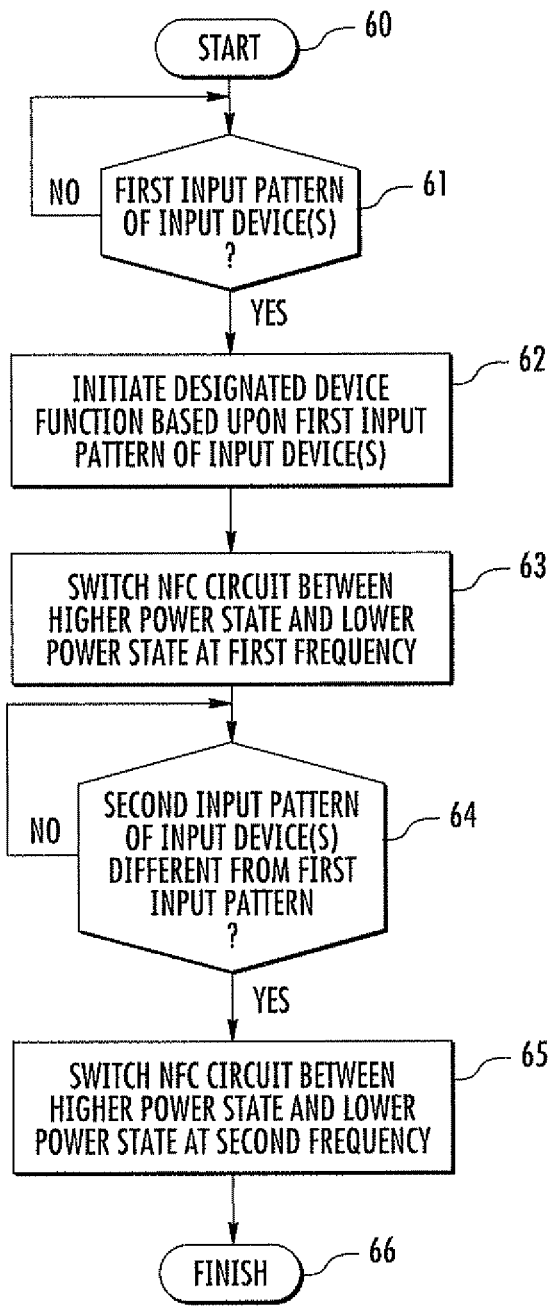
FIGS. 6 and 7 are flow diagrams illustrating NFC power switching method aspects associated with the system or devices of FIG. 1.

Operation of the processor 37 and the advantageous NFC power state switching features performed thereby will now be described with reference to FIGS. 6 and 7. Beginning at Block 60, the processor 37 is advantageously configured to initiate the designated device function (menu generation in the present example) based upon a first input or manipulation pattern of the input key 35, at Blocks 61-62. As noted above, this first manipulation pattern comprises a single actuation of the input key 35, although a first different actuation pattern may be used in other embodiments. Moreover, a different input key may be selected for initiation of NFC operations, such as the on-hook key 43, a side convenience key designated for a different designated device function, etc. Furthermore, more than one such key may be designated to initiate the same NFC functionality.

The processor 37 is further configured to switch the NFC circuit 36 between a higher power state and a lower power state at a first frequency, at Block 63. More particularly, this operation would correspond to a typical low power mode as specified by the above-described NFC standard materials, in which the NFC circuit 36 cycles on (high power) and off (low power), usually every three seconds. Such power cycling is advantageous because in the high power state, the NFC circuit 36 is configured to generate a radio frequency (RF) field to initiate NFC communications with the other NFC device 32. To leave this field on continuously in the NFC device 31 where the power source 34 is a battery (as seen in the more detailed view of the NFC device 31 illustrated in FIG. 5) would deplete the battery at an undesirable rate, which is why the low power recognition mode may be used.

Yet, a difficulty with the standard low power mode is that three seconds is a relatively long time in terms of NFC communications to wait for device recognition to occur, and may not be practical for some applications which require relatively quick acquisition and recognition. Thus, in some embodiments, the processor 37 may also advantageously be configured to switch the NFC circuit 36 between the higher power state and the lower power state at a second frequency different than the first frequency based upon a second manipulation pattern of the input key 35 different from the first manipulation pattern, at Blocks 64-65, thus concluding the method illustrated in FIG. 6 (Block 66).

By way of example, the second manipulation pattern may include multiple (e.g., two) actuations or pressings of the input key 35 in succession, i.e., within a threshold period or window of time (e.g., one second or less). Moreover, the second frequency may be faster than the first frequency, e.g., about one second (or less), which is three times faster than the above-noted first frequency of three seconds. However, in different embodiments the first and second frequencies may take other values besides those example values set forth herein. As such, the NFC device 31 advantageously provides desired NFC device recognition without undue delay, yet while still maintaining power savings from low-power operation.

Figure 7:
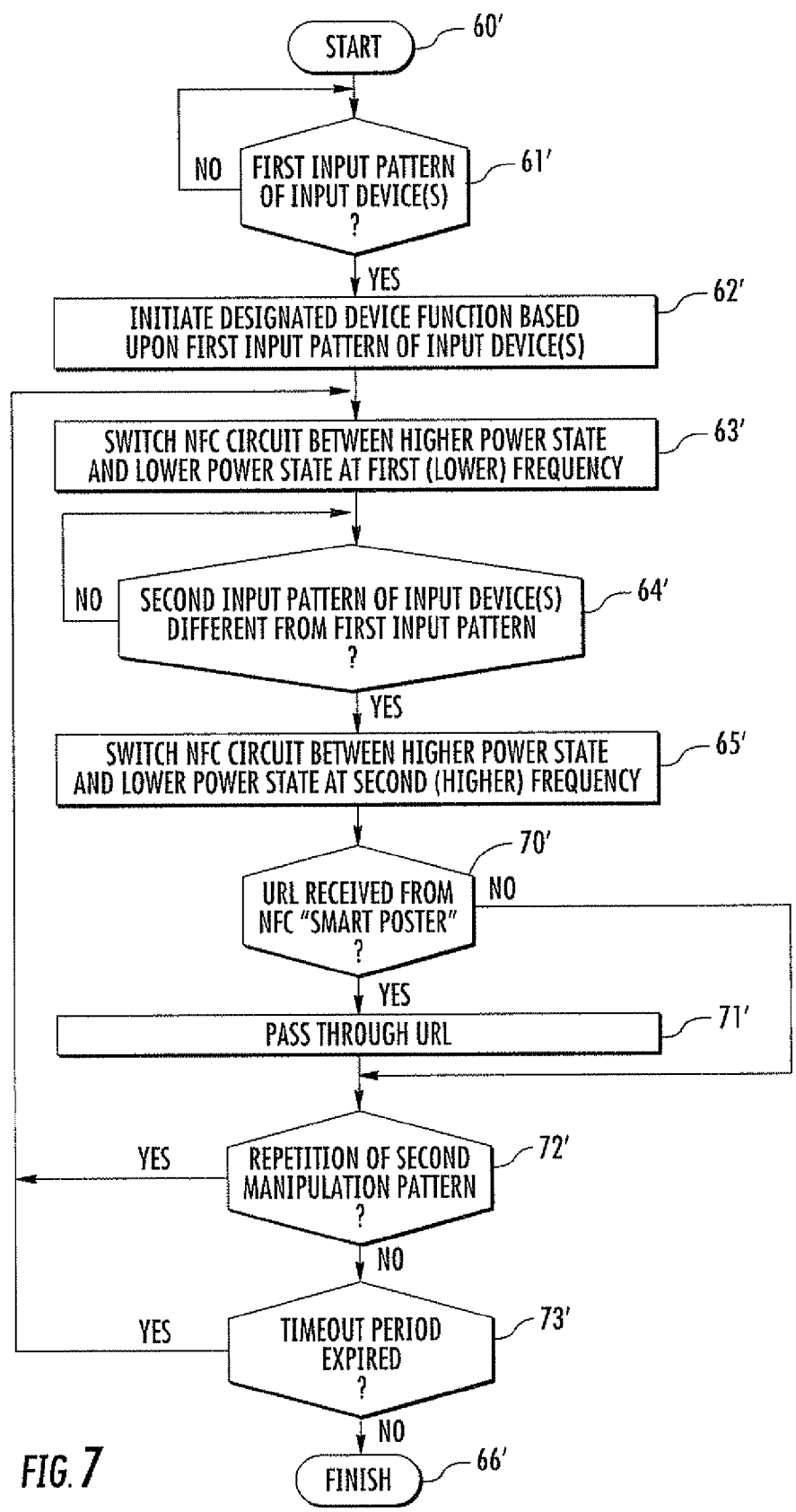

The processor 37 may be further advantageously configured to switch the NFC circuit 36 from the second frequency back to the first frequency based on a repetition of the second manipulation pattern of the input key 35, at Block 72' (FIG. 7). For example, it may be desirable to switch the NFC device 31 to the second frequency when approaching an NFC tag/reader (e.g., a subway or ticket kiosk, etc.) and quick recognition is required, but to switch back when no longer in proximity of the NFC tag/reader to save power, as well as for security reasons.

In this regard, when the second manipulation pattern occurs and power is cycled to the NFC circuit 36 at the second frequency, this may indicate to the processor 37 that the NFC device 31 is in proximate to a trusted NFC device, and therefore the processor 37 may temporarily lessen security requirements when authorizing and communicating with the trusted NFC device. For example, the processor 37 may proceed directly to communicate with the trusted NFC device, and in the case of a "smart poster" NFC device, such as one configured to pass a Uniform Resource Locator (URL), the processor 37 may automatically direct a browser application thereof to the URL without prompting for permission to proceed to the designated location, at Blocks 70'-71'.

For the same reasons, the processor 37 may be configured to switch the NFC circuit 36 from the second frequency back to the first frequency after a timeout period, at Block 73'. In other words, the processor 37 may perform an automatic switching back to the first frequency based upon the timeout condition, in addition to, or instead of, the manual switch back described above (i.e., resulting from the second manipulation pattern being initiated again).

Figure 3:
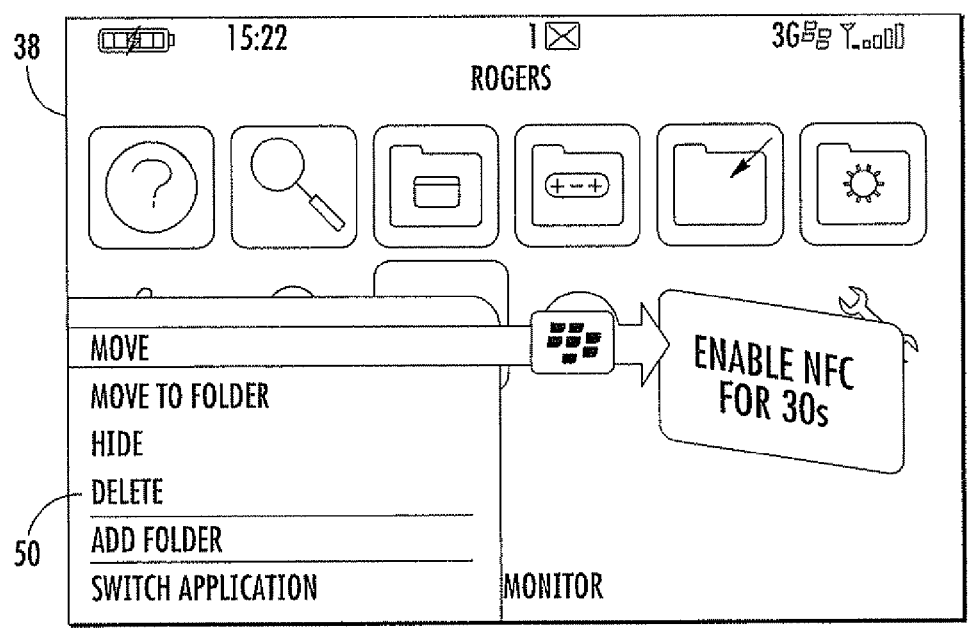
FIGS. 3 and 4 are example screen prints which may be provided on a display of the mobile device of FIG. 2 upon implementation of NFC power state switching.
Figure 4:
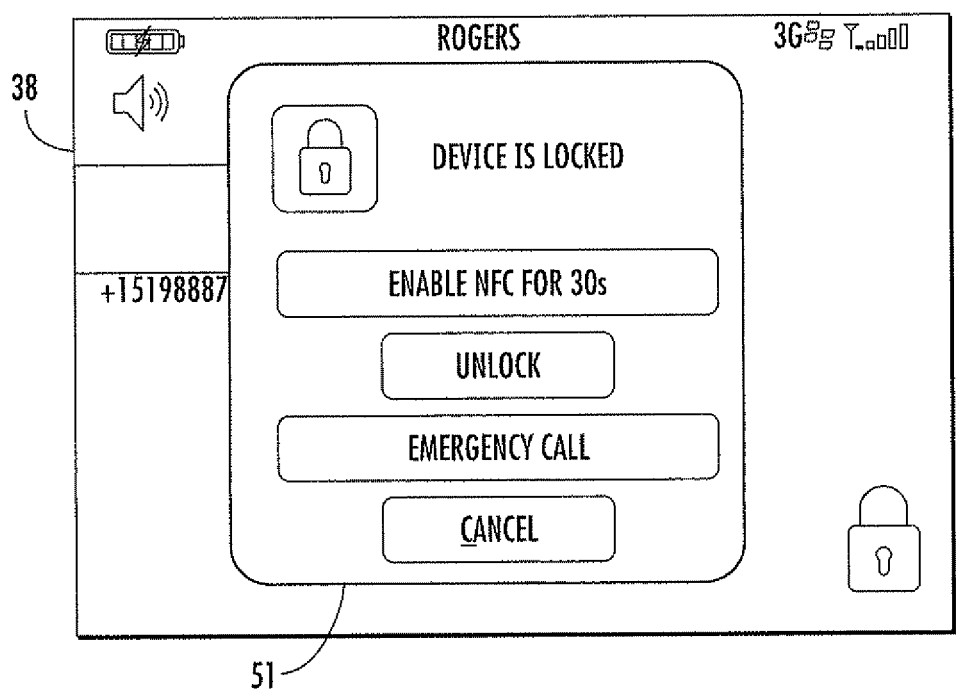

Example menus 50, 51 that may be generated by the input (i.e., menu) key 35 are respectively shown in FIGS. 3 and 4. More particularly, the menu 50 is generated by the processor 37 when the NFC device 31 is in a normal operating mode and the input key 35 is actuated. In some embodiments, if the display 38 is not illuminated, a first actuation may initially illuminate the display, and a subsequent actuation may then generate the menu 50. The menu options provided by the processor 37 in the menu 50 may vary depending upon the various operations being performed by the device (e.g., the menu generated on a "home" screen will be different than the one generated while an email application is open, etc.). In the illustrated example, upon initiation of the first manipulation pattern the menu 50 includes the following options: move, move to folder, hide, delete, add folder, and switch application. So, in the present example, the menu 50 would be displayed upon a first actuation or pressing of the input key 35.

However, when the second manipulation pattern of the input key 35 is detected, i.e., a double tap or second actuation/pressing of the input key 35, then the processor 37 causes switching of the NFC circuit 36 based upon the second frequency, which is indicated by an arrow extending from the menu 50 and notation that this NFC operational mode has been enabled for thirty seconds. However, it should be noted that other timeout periods greater or lesser than thirty seconds may be used in some embodiments (e.g., one minute, two minutes, etc.), and in other embodiments the timeout period may not be used at all.

Turning to the menu 51, here the processor 37 generates a menu on the display 38 for enabling initiation of NFC device recognition and communications with the other NFC device 32 upon detection thereof from a "locked" device mode. That is, the menu 51 is generated from the locked mode, meaning that the keypad (whether touch screen or individual buttons) or other convenience keys are disabled by the processor 37. In some locked modes, the display 38 may be changed to a default image as well (e.g., a blank screen with only a background color/image and no icons). In this case, the menu 51 generated by the processor 37 may advantageously be different than the menu 50, since there is a relatively small selection of operations that may be performed from the locked mode. So, when in the locked mode and the input key 35 is actuated once, the menu 51 is displayed and illustratively includes the following options: enable NFC for thirty seconds; unlock; emergency call; and cancel. The "enable NFC for 30s" option is highlighted so that upon a second actuation of the input key 35 this option is automatically selected, again causing the processor 37 to implement switching at the second frequency. While this menu option may also be selected directly on the touch screen display 38, a second actuation of the input key 35 typically may be performed much easier and faster.

The NFC device 31 therefore advantageously provides a relatively convenient and consistent way of enabling the NFC circuit 36 for a short period of time, which may be particularly helpful for applications with relatively low security requirements, or for relatively low-value payment transactions. The above-described implementation further advantageously utilizes an existing input key 35 on the NFC device 31 and provides for relatively easy access to enable NFC communications.

A related physical, computer-readable medium may have computer-executable instructions for causing the NFC device 31 to perform steps including initiating the designated device function based upon a first manipulation pattern of the input key 35, and switching the NFC circuit 36 between a higher power state and a lower power state at a first frequency, as discussed above. Moreover, a further step may include switching the NFC circuit 36 between the higher power state and the lower power state at a second frequency different than the first frequency based upon a second manipulation pattern of the input key 35 different from the first manipulation pattern, again as further discussed above.

Turning now to FIGS. 8-12, another drawback of the existing NFC lower-power tag detection approach is that it does not work in conjunction with a peer-to-peer NFC mode. In accordance with another advantageous aspect, an NFC system 130 and NFC devices 131, 132 advantageously provide a low power operation when in a peer-to-peer operating mode. That is, in the NFC system 130 both devices 131, 132 are operational in a peer-to-peer NFC mode.

Figure 8:
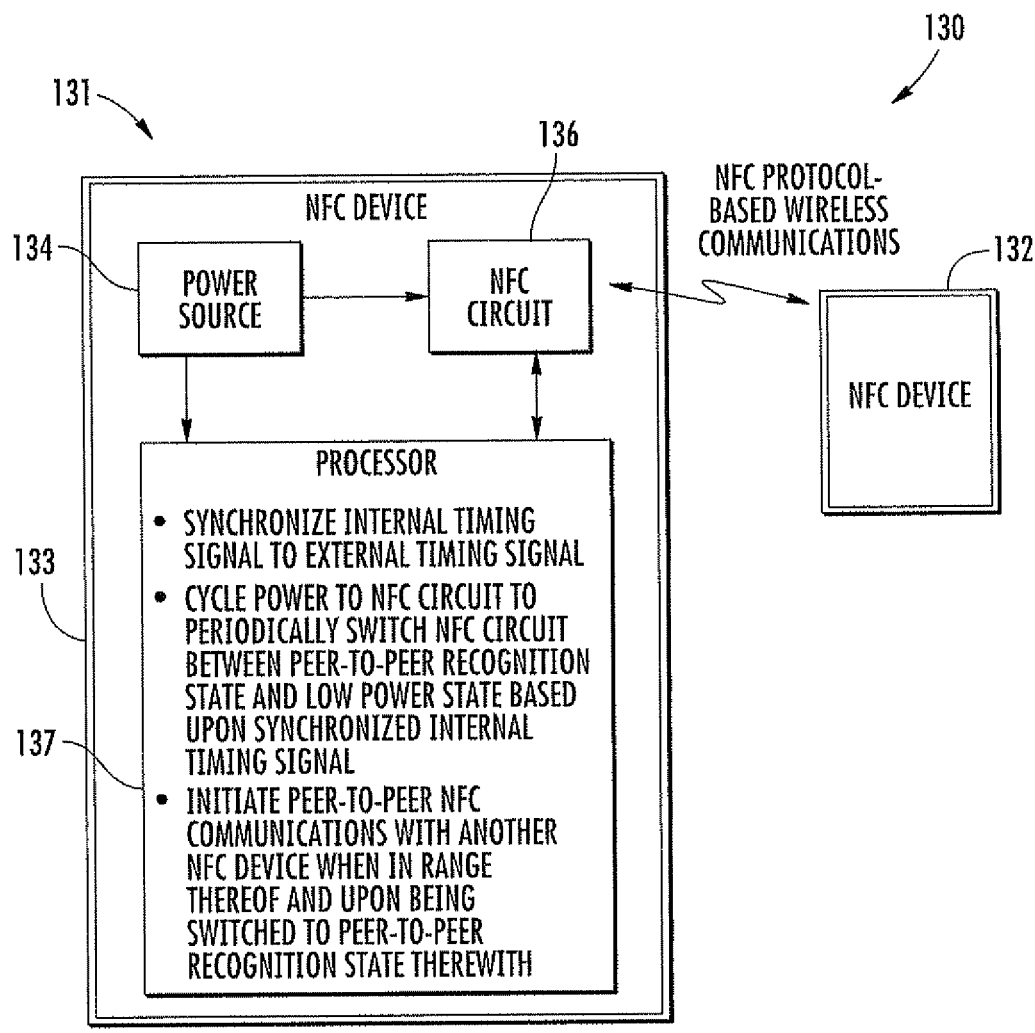
FIG. 8 is a schematic block diagram of an alternative NFC system in accordance with an example aspect providing synchronized peer-to-peer recognition features.
Figure 9:
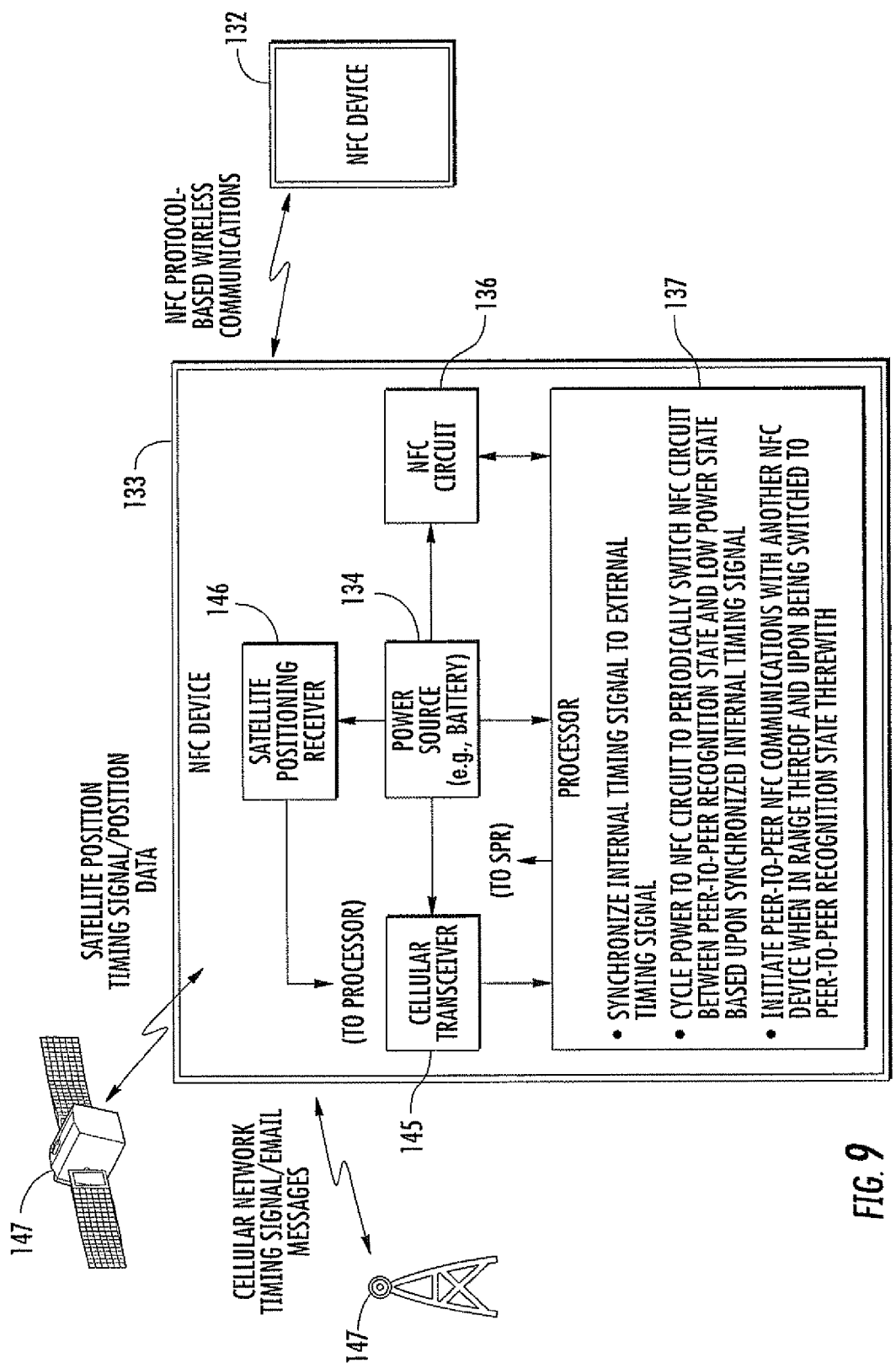
FIG. 9 is a schematic block diagram of an example NFC device of the system of FIG. 8 shown in greater detail.

The various components illustrated in FIGS. 8 and 9 that correspond to those previously discussed above with reference to FIGS. 1 and 2 are numbered in increments of decades (i.e., the power source 34 is similar to the power source 134, etc.) for clarity of reference. As such, to the extent these components have already been explained above that explanation will not be repeated here, and the following discussion will accordingly focus on the additional operations performed by such components in accordance with the present example.

Figure 11:
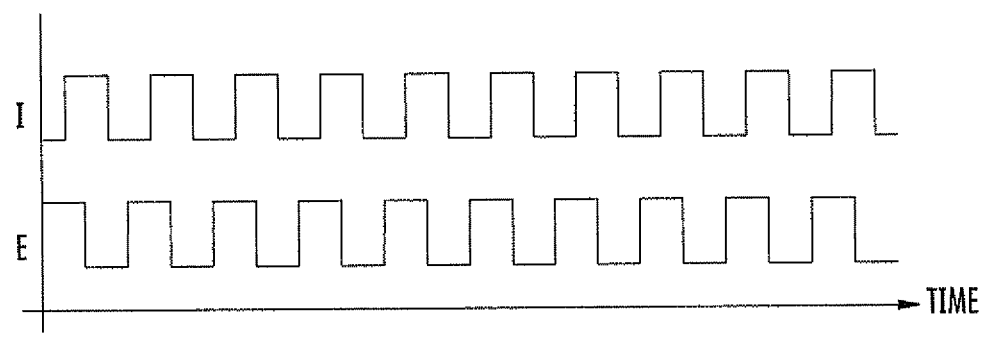
FIGS. 11 and 12 are signal timing diagrams illustrating signal synchronization operations performed by the devices of the system of FIG. 8.
Figure 12:
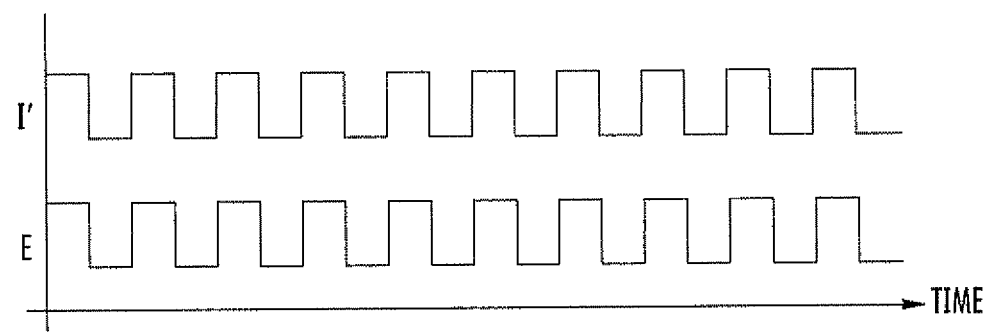
Figure 13:
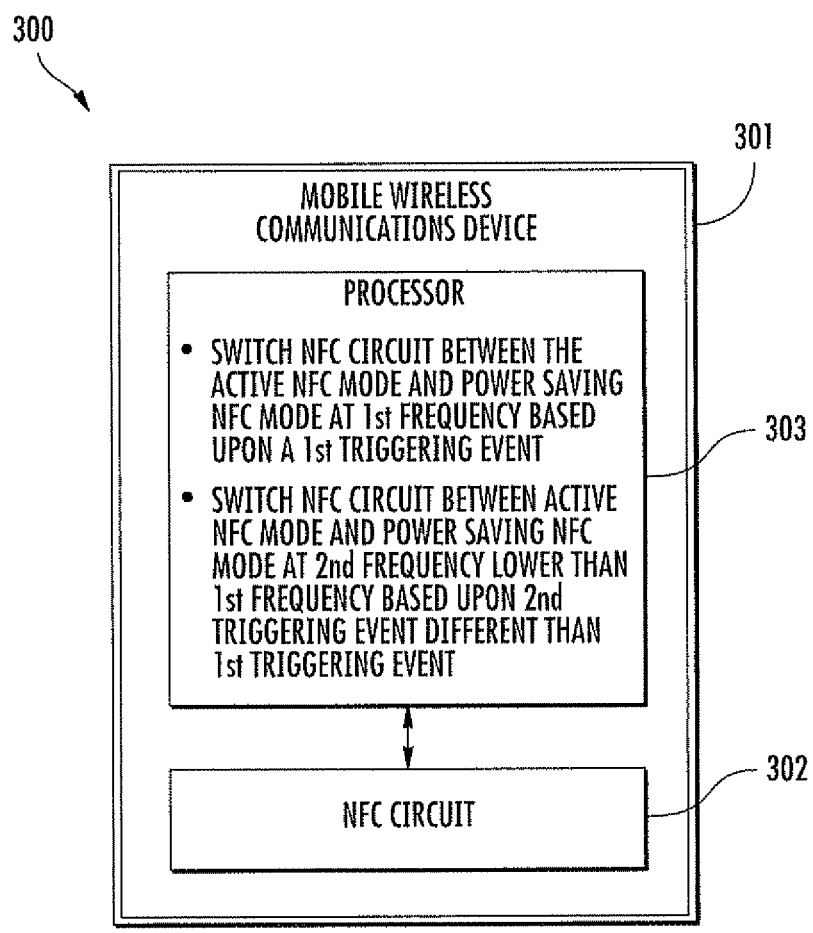
FIG. 13 is a schematic block diagram of an example mobile wireless communications device providing enhanced NFC power saving mode switching in accordance with another example embodiment.
Figure 14:
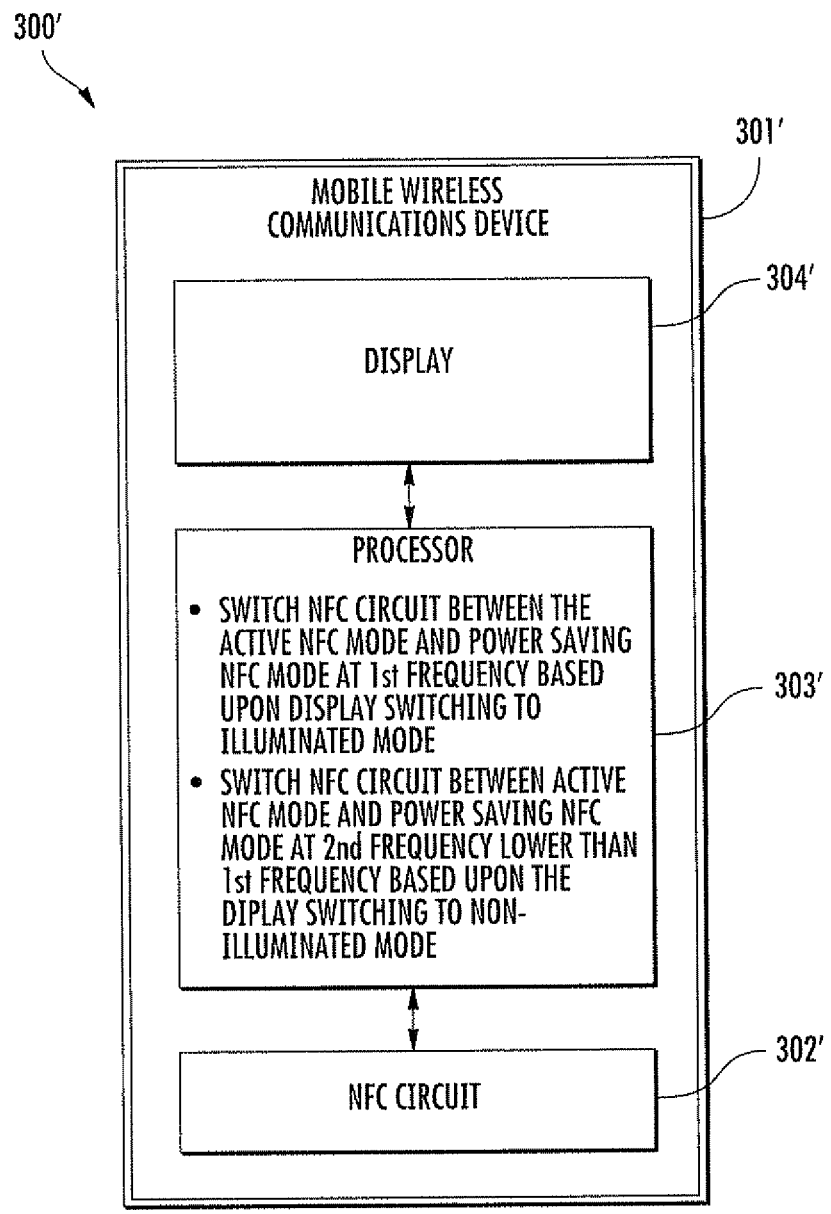
FIGS. 14 and 15 are schematic block diagrams of example alternative embodiments of the mobile wireless communications device of FIG. 13.

Beginning at Block 200, the processor 137 is advantageously configured to synchronize or temporally align an internal timing signal I (i.e., a local timing signal)# to an external timing signal E, at Block 201. The internal timing signal I is shown initially out of synchronization with the external timing signal E in FIG. 11, and FIG. 12 shown the internal timing signal I' after synchronization with the external timing signal E. It should be noted that the internal and external signals I, E need not be mirror images of one another to be synchronized as shown in FIG. 12, but may be synchronized in the sense that leading or trailing edges are temporally aligned (e.g., the signals could be inverted with respect to one another but still synchronized in time).

The internal timing signal I may be generated by the processor 137 using a variety of techniques. Furthermore, the external timing signal E may be obtained from a number of different sources, as seen in FIG. 9. For example, the processor 137 may be configured to synchronize the internal timing signal I to a cellular network timing signal as the external timing signal E via the cellular transceiver 145. In accordance with another option, each NFC device 131, 132 may further include a satellite positioning receiver 146 coupled to the processor 137 and configured to receive a satellite positioning system (e.g., GPS, Galileo, GLONASS, etc.) timing signal from one or more satellites 147, with which the processor 137 is configured to synchronize the internal timing signal to as the external timing signal I. Still another option is that the processor 137 may be configured to synchronize the internal timing signal I to the common external system timing signal E via the NFC circuit 136 (e.g., synchronization to GMT or other accurate time source via NFC communications, etc.).

The processor 137 is further configured to cycle power to the NFC circuit 136 to periodically switch the NFC circuit 136 between a peer-to-peer recognition state and a low power state based upon the synchronized internal timing signal I, at Block 202. When NFC devices are powered up and operating in a peer-to-peer mode, they continuously generate an RE field for recognizing and communicating with other NFC devices. However, because each of the devices 131, 132 is synchronized to the same external timing signal and performs the power cycling at the same intervals, they advantageously generate their respective RF fields and perform device recognition at the same times, and thus these devices will be able to "see" each other despite now operating in a power saving mode.

Figure 10:
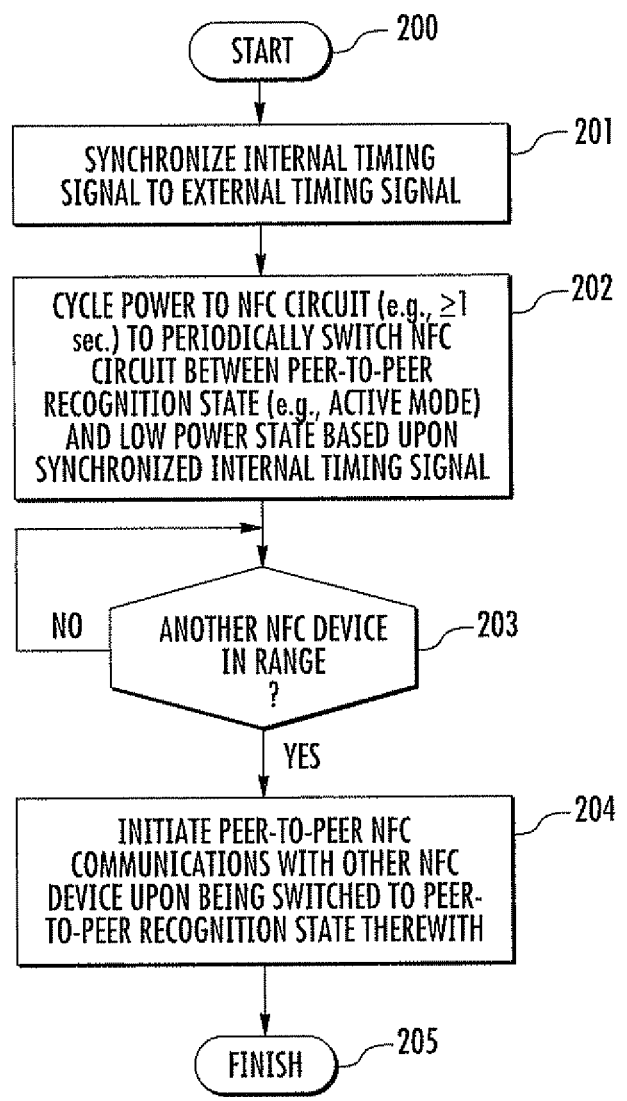
FIG. 10 is a flow diagram illustrating synchronized NFC peer-to-peer recognition method steps associated with the system or devices of FIG. 8.

Thus, the processor 137 of the device 131 is also advantageously configured to initiate peer-to-peer NFC communications with the other device 132 when in range thereof upon being switched (e.g., simultaneously switched) to the peer-to-peer recognition state therewith, at Blocks 203-204, thus concluding the method illustrated in FIG. 10 (Block 205). As such, the system advantageously addresses the technical problem of providing a relatively low-power NFC peer-to-peer recognition mode, while still providing desired recognition times without undue delay.

The processor 137 may further be configured to operate the NFC circuit 136 in an active communication mode in the peer-to-peer recognition state. Furthermore, the processor 137 may be configured to cycle power to the NFC circuit 136 at various time intervals, although an interval of not greater than one second may be desirable, as shorter durations may be particularly beneficial from a rapid recognition standpoint, such as in the range of approximately 200 µs to approximately 600 µs, for example, although other durations may be used in different embodiments. Generally speaking, the interval is balanced to be long enough to provide desired power savings but also quick recognition times.

It should be noted that in the system 130, both NFC devices 131, 132 need not be mobile wireless NFC devices. For example, some electronic devices such as televisions, printers, etc., may be enabled with NFC circuitry, but these devices are essentially stationary and typically plugged in to a building power source. As such, while power savings may not be as high a priority for stationary or wall-powered devices, such stationary devices may still operate as described above and be included in the system 130 (or the system 30 in some embodiments) to initiate NFC communications with mobile devices which utilize these techniques to conserve battery power. Moreover, it should also be noted that while two devices are shown in the above-described system 30, 130 for ease of illustration, in some embodiments more than two devices may be included in the particular system.

A related physical computer-readable medium is also provided and may have computer-executable instructions for causing the NFC device 131 to perform steps including synchronizing an internal timing signal I of the NFC device to an external timing signal E, and cycling power to the NFC circuit 136 to periodically switch the NFC circuit between a peer-to-peer recognition state and a low power state based upon the synchronized internal timing signal I'. A further step may include initiating peer-to-peer NFC communications with another NFC device 132 when in range thereof and upon being simultaneously switched to the peer-to-peer recognition state therewith.

Referring now additionally to FIGS. 13-16, in accordance with another example embodiment a mobile device 300 illustratively includes a portable housing 301 and an NFC circuit 302 carried by the portable housing. As discussed above, the NFC circuit 302 may be switched between different operating modes, including an active NFC mode, and a power saving mode, such as a passive mode or an unpowered mode. The mobile device 300 further illustratively includes a processor 303 carried by the portable housing 301 that is coupled to the NFC circuit 302. Beginning at Block 350, the processor 303 is configured to switch the NFC circuit 302 between the active NFC mode and the power saving NFC mode at a first frequency based upon a first triggering event, at Blocks 351-352, and switch the NFC circuit between the active NFC mode and the power saving NFC mode at a second frequency lower than the first frequency based upon a second triggering event different than the first triggering event, at Blocks 353-354, thus concluding the method illustrated in FIG. 16 (Block 355). By way of example, this may be done by setting the active NFC mode "on" or "burst" time to a given or fixed duration, and changing the power saving NFC mode time between bursts. That is, the processor 303 may cycle the NFC circuit 302 to the active NFC burst mode with longer or shorter power saving NFC mode durations therebetween. Generally speaking, the duration of the active mode pulse should be long enough to recognize a load on the electromagnetic field, such as about 60 μs, although other durations may also be used.

Generally speaking, the first triggering event may be an action or operation which indicates that the mobile device 300 is in use. In the example shown in FIG. 14, the mobile device 300' includes a display 304', and one triggering event that may indicate the mobile device is in use (i.e., a first triggering event) is when the display is illuminated. Conversely, a second triggering event which is indicative of the mobile device 300' not being in use is when the display 304' is not illuminated, i.e., it is in a non-illuminated or "sleep" mode. By way of example, the first frequency may be five or more times per second, whereas the second frequency may be less than five times a second (e.g., once per second), although other values for these frequencies may also be used in different embodiments. Moreover, subsequent triggers may optionally be used to further decrease the active mode cycling frequency, or turn off the active mode indefinitely in some implementations.

In some embodiments the display 304' may be illuminated based upon a key press, etc., even if the display or mobile device 300' is in a locked mode. Other events that may cause the display 304' to be illuminated, or otherwise serve as a first triggering event, include a calendar reminder generated by a calendar application running on the mobile device 300', receipt of a message (e.g., email, SMS, MMS, etc.) via a wireless network, etc. By associating the frequency at which cycling to the NFC power saving mode is performed with the operational state of the display 304', this provides a ready indication that if the display 304' is illuminated, then the NFC circuit 302' is in its fastest NFC acquisition mode. The processor 303' may be further configured to implement a delay period or lag time after the display 304' is switched to the non-illuminated mode. This may advantageously help reduce situations where the display 304' goes into a sleep mode (i.e., the non-illuminated mode) while the NFC circuit 302' is attempting to engage in communications with another NFC device, which may otherwise increase the possibility of not establishing an NFC communications link therewith if the NFC circuit 302' is switched to the slower NFC acquisition mode. Similarly, establishing an NFC communications link may serve as a first triggering event that causes the processor 303' to switch between the active NFC mode and the power saving NFC mode at the first (i.e., faster) frequency.

Figure 15:
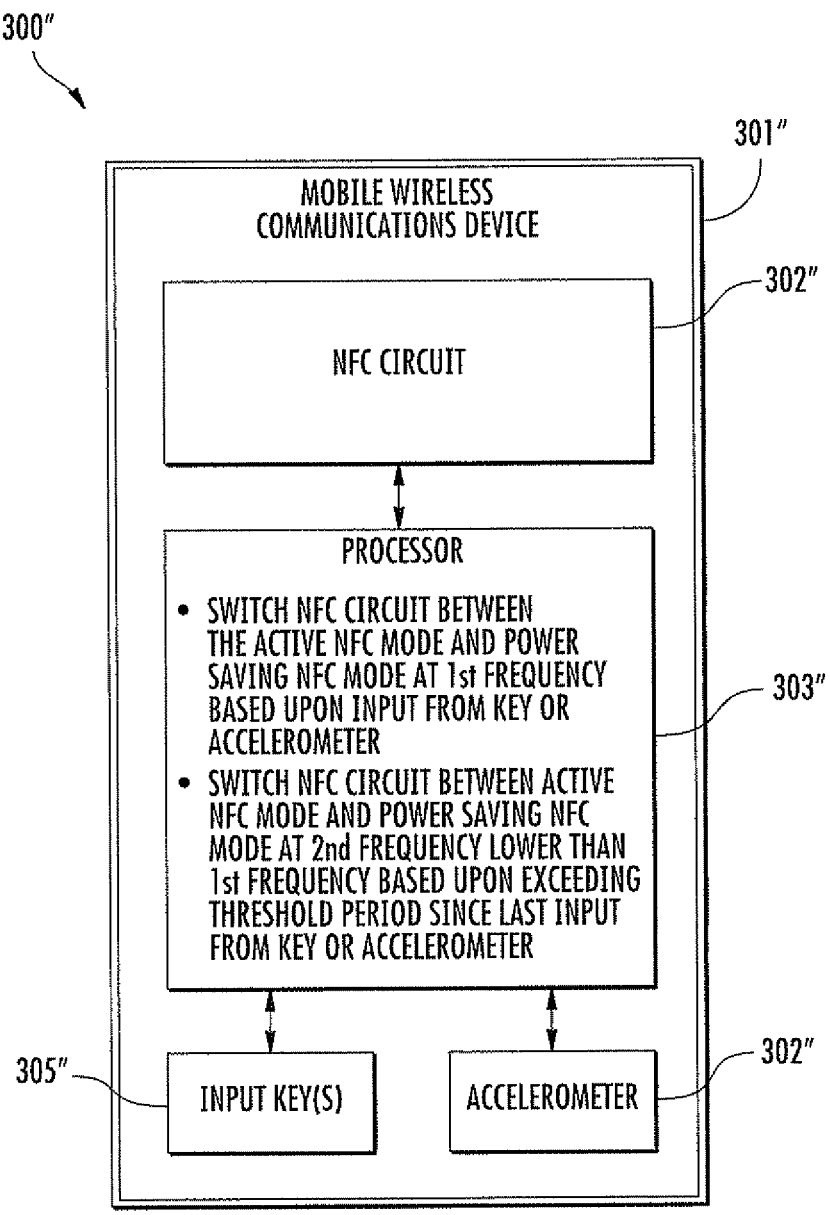
Figure 16:
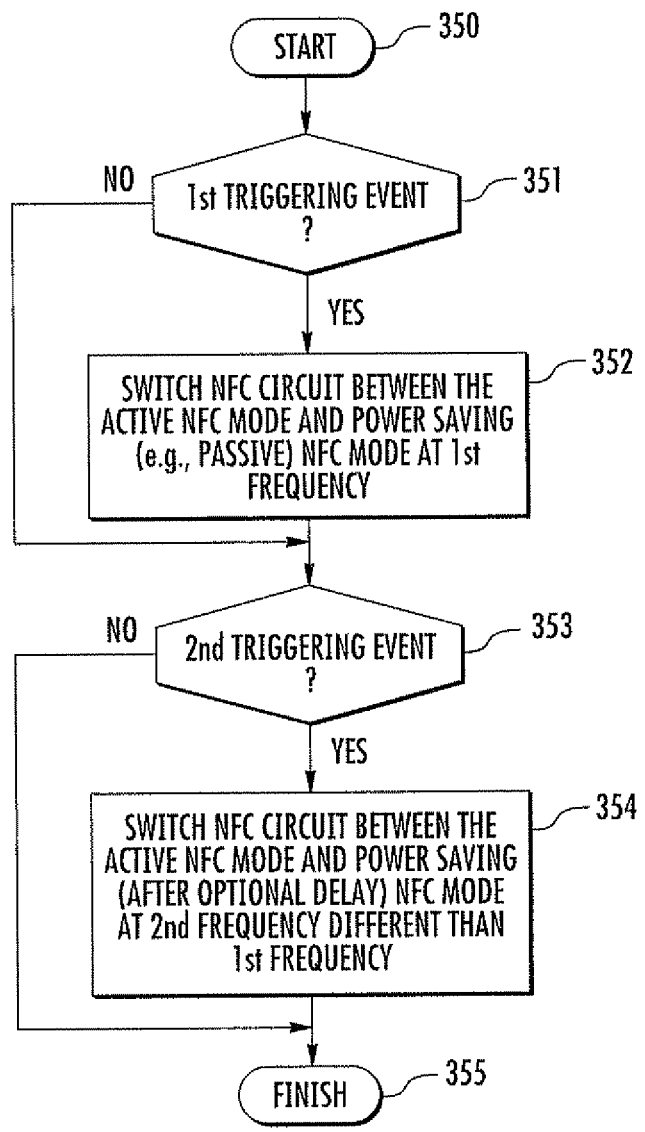
FIG. 16 is a flow diagram illustrating method aspects associated with the system of FIG. 13.

In the example shown in FIG. 15, the mobile device 300" illustratively includes two input devices, namely an input key(s) 305" (such as found on a keypad, a convenience key or button, etc., as noted above) and an accelerometer 306". Other examples of input devices may include track balls, touch pads, scroll wheels, biometric sensors, touch screens, etc. With respect to a given input device, the first triggering event may comprise an input therefrom (e.g., key press, movement detection by accelerometer 306", etc.), while the second triggering event may comprise exceeding a threshold period since a last input is received. For example, if the input key 305" is not pressed or no motion is detected by the accelerometer 306" within the threshold period (e.g., ten seconds), then the processor 303" causes the NFC circuit 302" mode cycling to occur at the second, slower rate to thereby conserve power. Other threshold periods may be used, and in some embodiments this threshold may be user-selectable. Further, it should be noted that not all of the input devices on a given mobile device need be used for NFC mode switching purposes in all embodiments, i.e., the NFC mode switching may be associated with one or more input devices in different embodiments.

One particular advantage of using an input device for triggering the change in frequency of the NFC circuit 302" power saving mode cycling is that input from a particular key 305" or the accelerometer 306" need not "wake up" (i.e., illuminate) the display 304', which may help provide further power savings if NFC communications may be performed in the background, for example. In such embodiments, a "click" from the key 305" or other feedback may be used to provide a suitable indication that the NFC mode switching frequency has been changed without the need for visual verification on the display 304'. With respect to the accelerometer 306", NFC communications typically require "swiping" of another NFC device, and therefore movement of the mobile device 300", may be taken to mean that the device is being carried or transported, making the first NFC mode switching frequency more appropriate, while the second frequency would be more appropriate when the mobile device is at rest. It should be noted that other input devices or sensors may similarly be used to detect when the mobile device 300" is held in a hand or being moved (e.g., infrared (IR) sensor, motion sensor, image (e.g., camera) sensor, etc.).

The mobile devices 300, 300', and 300" may further include one or more wireless transceivers (e.g., cellular, WiFi, WiMAX, etc.), and the processors 303, 303', and 303" may also be configured for communicating email messages, as discussed further above. A non-transitory computer-readable medium is also provided for causing the NFC circuit 302 to switch between the active NFC mode and the power saving NFC mode at a first frequency based upon a first triggering event, and switch between the active NFC mode and the power saving NFC mode at a second frequency lower than the first frequency based upon a second triggering event different than the first triggering event, as discussed further above.

Example components of a mobile wireless communications device 1000 that may be used in accordance with an example embodiment are further described below with reference to FIG. 17. The device 1000 illustratively includes a housing 1200, a keyboard or a keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 17:
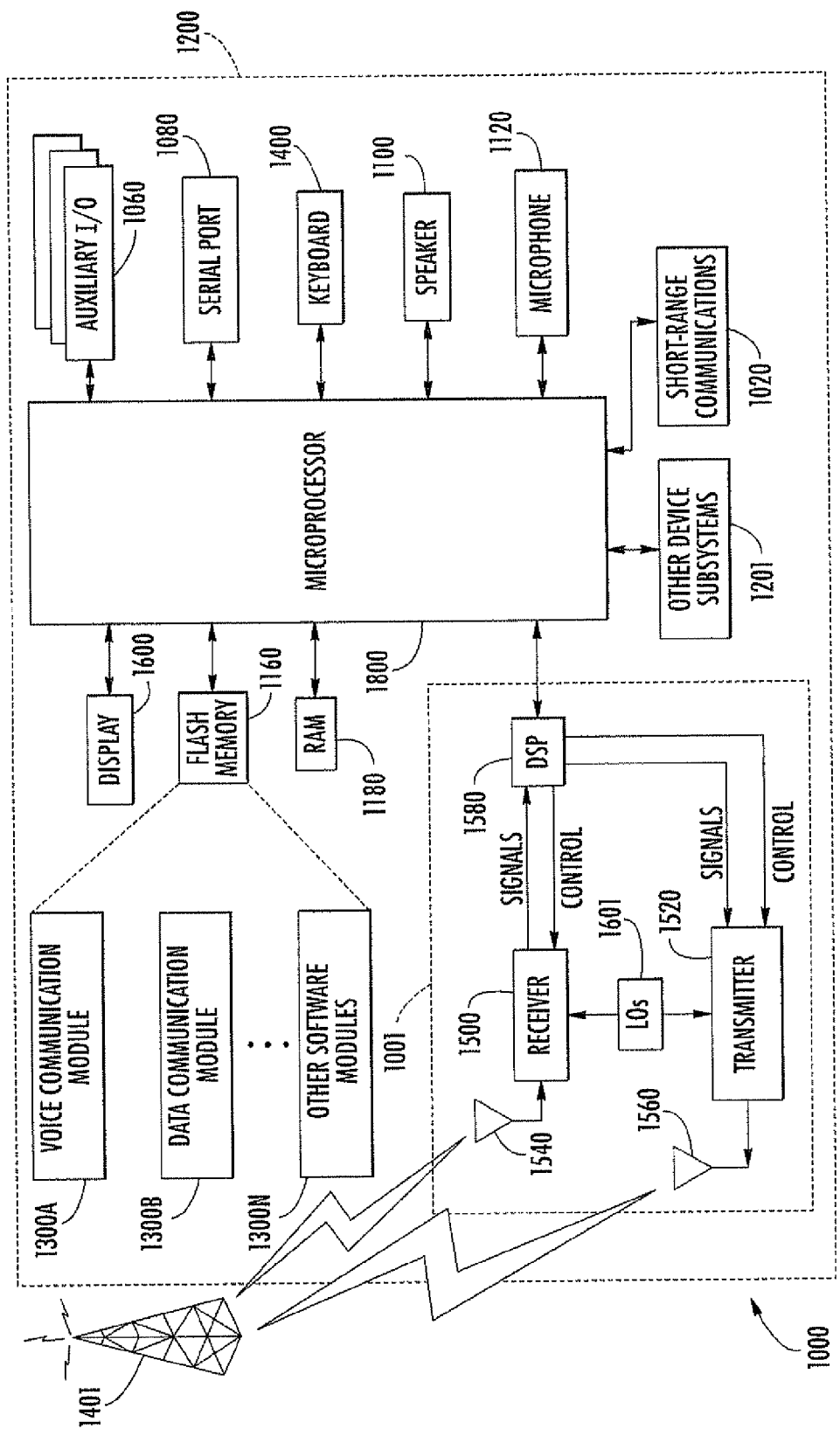
FIG. 17 is a schematic block diagram illustrating example components of a mobile wireless communications device that may be used in accordance with the systems of FIG. 1, 8, or 13.

In addition to the processing device 1800, other parts of the mobile device 1000 are shown schematically in FIG. 17. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, NFC or a Bluetooth™ communications module to provide for communication with similarly-enabled systems and devices.

Many modifications and other embodiments will come to the mind of one skilled in the art having the benefit of the That which is claimed is:

1. A near-field communication (NFC) system comprising:
a plurality of NFC devices each comprising
    a housing,
    a power source carried by said housing,
    at least one input device carried by said housing and assigned to a designated device function,
    an NFC circuit configured to wirelessly communicate using an NFC communications protocol, and
    a processor carried by said housing and coupled to said power source, said at least one input device, and said NFC circuit, the processor being configured to
        initiate the designated device function based upon a first input pattern of said at least one input device,
        switch said NFC circuit between a higher power state and a lower power state at a first frequency, said NFC circuit in the higher power state being configured to generate a radio frequency (RF) field to initiate NFC communications with another one of said NFC devices,
        switch said NFC circuit between the higher power state and the lower power state at a second frequency different than the first frequency based upon a second input pattern of said at least one input device different from the first input pattern, and
        lessen a security requirement for authorizing and communicating with another NFC device based upon the second manipulation pattern of said at least one input key.

2. The NFC system of claim 1 wherein said processor is further configured to switch said NFC circuit from the second frequency back to the first frequency based upon a repetition of the second input pattern of said at least one input device.

3. The NFC system of claim 1 wherein said processor is configured to switch said NFC circuit from the second frequency back to the first frequency after a timeout period.

4. The NFC system of claim 1 wherein the first frequency is lower than the second frequency.

5. The NFC system of claim 1 further comprising a display carried by said portable housing and coupled to said processor.

6. The NFC system of claim 5 wherein said processor is further configured to generate on said display a menu for enabling initiation of NFC communications with said other NFC device upon detection thereof.

7. The NFC system of claim 5 wherein said at least one input device comprises a menu key, and wherein the designated device function comprises generating a menu on said display.

8. The NFC system of claim 1 wherein said at least one input device comprises an accelerometer.

9. The NFC system of claim 1 wherein said at least one input comprises an audio input transducer.

10. The NFC system of claim 1 wherein said processor is further configured to pass through a Uniform Resource Locator when at the second frequency and being in the higher power state.

11. A near-field communication (NFC) device comprising:
a housing;
a power source carried by said housing;
at least one input device carried by said housing and assigned to a designated device function;
an NFC circuit configured to wirelessly communicate using an NFC communications protocol; and
a processor carried by said housing and coupled to said power source, said at least one input device and said NFC circuit, the processor being configured to
    initiate the designated device function based upon a first input pattern of said at least one input device,
    switch said NFC circuit between a higher power state and a lower power state at a first frequency, said NFC circuit in the higher power state being configured to generate a radio frequency (RF) field to initiate NFC communications with another NFC device,
    switch said NFC circuit between the higher power state and the lower power state at a second frequency different than the first frequency based upon a second input pattern of said at least one input device different from the first input pattern, and
    lessen a security requirement for authorizing and communicating with another NFC device based upon the second manipulation pattern of said at least one input key.

12. The NFC device of claim 11 wherein said processor is further configured to switch said NFC circuit from the second frequency back to the first frequency based upon a repetition of the second input pattern of said at least one input device.

13. The NFC device of claim 11 wherein said processor is configured to switch said NFC circuit from the second frequency back to the first frequency after a timeout period.

14. The NFC device of claim 11 wherein the first frequency is lower than the second frequency.

15. A near-field communication (NFC) method for an NFC device comprising a housing, a power source carried by the housing, at least one input device carried by the housing and assigned to a designated device function, and an NFC circuit configured to wirelessly communicate using an NFC communications protocol, the method comprising:
    initiating the designated device function based upon a first input pattern of the at least one input device;
    switching the NFC circuit between a higher power state and a lower power state at a first frequency, the NFC circuit in the higher power state being configured to generate a radio frequency (RF) field to initiate NFC communications with another NFC device;
    switching the NFC circuit between the higher power state and the lower power state at a second frequency different than the first frequency based upon a second input pattern of the at least one input device different from the first input pattern; and
    lessening a security requirement for authorizing and communicating with another NFC device based upon the second manipulation pattern of said at least one input key.

16. The method of claim 15 further comprising switching the NFC circuit from the second frequency back to the first frequency based upon a repetition of the second input pattern of the at least one input device.

17. The method of claim 15 further comprising switching the NFC circuit from the second frequency back to the first frequency after a timeout period.

18. The method of claim 15 wherein the first frequency is lower than the second frequency.

19. A non-transitory computer-readable medium having computer-executable instructions for causing a near-field communication (NFC) NFC device comprising a housing, a power source carried by the housing, at least one input device carried by the housing and assigned to a designated device function, and an NFC circuit configured to wirelessly communicate using an NFC communications protocol, to perform steps comprising:

initiating the designated device function based upon a first input pattern of the at least one input device;

switching the NFC circuit between a higher power state and a lower power state at a first frequency, the NFC circuit in the higher power state being configured to generate a radio frequency (RF) field to initiate NFC communications with another NFC device;

switching the NFC circuit between the higher power state and the lower power state at a second frequency different than the first frequency based upon a second input pattern of the at least one input device different from the first input pattern; and lessening a security requirement for authorizing and communicating with another NFC device based upon the second manipulation pattern of said at least one input key.

20. The physical computer-readable medium of claim 19 further having computer-executable instruction for causing the NFC device to perform a step of switching the NFC circuit from the second frequency back to the first frequency based upon a repetition of the second input pattern of the at least one input device.

21. The physical computer-readable medium of claim 19 further having computer-executable instruction for causing the NFC device to perform a step of switching the NFC circuit from the second frequency back to the first frequency after a timeout period.

22. The physical computer-readable medium of claim 19 wherein the first frequency is lower than the second frequency.

* * * * *

UNITED STATES PATENT AND TRADEMARK OFFICE
CERTIFICATE OF CORRECTION

| | | |
|---|---|---|
| PATENT NO. | : 8,787,830 B2 | Page 1 of 1 |
| APPLICATION NO. | : 12/856783 | |
| DATED | : July 22, 2014 | |
| INVENTOR(S) | : Moosavi et al. | |

It is certified that error appears in the above-identified patent and that said Letters Patent is hereby corrected as shown below:

In the Claims:

Column 14, Line 65    Delete: "NFC"

Signed and Sealed this
Fourteenth Day of October, 2014

Michelle K. Lee
*Deputy Director of the United States Patent and Trademark Office*